United States Patent
Ellis et al.

(10) Patent No.: US 8,214,063 B2
(45) Date of Patent: Jul. 3, 2012

(54) AUTO-TUNE OF A CONTROL SYSTEM BASED ON FREQUENCY RESPONSE

(75) Inventors: George Ellis, Blacksburg, VA (US); Erik Brewster, Sunnyvale, CA (US)

(73) Assignee: Kollmorgen Corporation, Radford, VA (US)

( * ) Notice: Subject to any disclaimer, the term of this patent is extended or adjusted under 35 U.S.C. 154(b) by 353 days.

(21) Appl. No.: 12/687,385

(22) Filed: Jan. 14, 2010

(65) Prior Publication Data

US 2011/0074330 A1 Mar. 31, 2011

Related U.S. Application Data (60) Provisional application No. 61/246,677, filed on Sep. 29, 2009, provisional application No. 61/256,583, filed on Oct. 30, 2009.

(51) Int. Cl.
*G05B 13/02* (2006.01)
(52) U.S. Cl. .......... 700/36; 700/29; 700/37; 700/39; 700/42; 700/45
(58) Field of Classification Search .......... 700/28–31, 700/36, 37, 39, 41–45
See application file for complete search history.

(56) References Cited

U.S. PATENT DOCUMENTS

| | | | |
|---|---|---|---|
| H1410 H * | 1/1995 | Hartley | 700/28 |
| 5,656,906 A | 8/1997 | Iwashita et al. | |
| 5,834,918 A | 11/1998 | Taylor et al. | |
| 6,081,751 A | 6/2000 | Luo et al. | |
| 6,198,246 B1 | 3/2001 | Yutkowitz | |
| 6,281,650 B1 | 8/2001 | Yutkowitz | |
| 6,510,353 B1 | 1/2003 | Gudaz et al. | |
| 6,622,099 B2 | 9/2003 | Cohen et al. | |
| 6,658,370 B2 | 12/2003 | Christ et al. | |
| 6,847,598 B2 | 1/2005 | Ikai | |
| 6,861,814 B2 | 3/2005 | Hayashi | |
| 6,917,049 B2 | 7/2005 | Krah et al. | |
| 6,961,628 B2 | 11/2005 | Yutkowitz | |
| 6,980,869 B1 | 12/2005 | Chandhoke | |
| 7,035,694 B2 | 4/2006 | Ramamoorthy et al. | |
| 7,190,144 B2 | 3/2007 | Huang | |
| 7,292,001 B2 | 11/2007 | Sato et al. | |
| 2002/0019715 A1 | 2/2002 | Cohen et al. | |
| 2002/0022903 A1 | 2/2002 | Krah et al. | |
| 2004/0046523 A1 | 3/2004 | Knirck et al. | |
| 2004/0193385 A1 | 9/2004 | Yutkowitz | |
| 2009/0204267 A1 | 8/2009 | Sustaeta et al. | |

* cited by examiner

*Primary Examiner* — Sean Shechtman
(74) *Attorney, Agent, or Firm* — Christine Q. McLeod; Beusse Wolter Sanks Mora & Maire, P.A.

(57) ABSTRACT

A method and system of determining tuning parameters for use in tuning a controller used in a process control loop for a motor and associated load. The method includes providing tuning parameters, applying an excitation test signal, receiving frequency response data to determine phase and gain margins, creating an instability region defined by a bounded area that connects the phase and gain margins with a boundary on a gain vs. phase plot, assigning and applying cost functions, and computing stability determinations.

27 Claims, 7 Drawing Sheets

Overview
Figure 1

Control structure
Figure 2

Detail of Control Structure
Figure 3

Detail of Autotune Algorithm
Figure 4a

Different iso-stable regions
Figure 5b

Open-loop gain and open-loop phase vs. Frequency
Figure 6

AUTO-TUNE OF A CONTROL SYSTEM BASED ON FREQUENCY RESPONSE

CROSS-REFERENCE TO RELATED APPLICATION

This application claims the benefit of U.S. Provisional Application Nos. 61/246,677, filed Sep. 29, 2009 and 61/256,583, filed Oct. 30, 2009, incorporated herein by reference.

FIELD OF THE INVENTION

This invention relates to a method and system for an auto-tuning of a motor controller. More particularly, the present invention relates to a method and system by which a controller of a control system for a motor and associated load is automatically tuned based on frequency response.

BACKGROUND OF THE INVENTION

A control system generally includes a controller and a plant (e.g., motor driving a load) to be controlled which is connected to the controller through a feedback loop. In operation, the plant is controlled by the output of the controller and the plant output is fed back via a feedback path where it is subtracted from a reference input to form an error signal. This error signal is processed by the controller to generate a modified control input to the plant. The controller needs tuning to maintain an optimization of command response, disturbance rejection, stability, and noise susceptibility in the presence of changes in characteristic properties such as motor/load inertia, resonance due to a compliance, backlash and friction etc.

A controller usually includes filters and control laws. Control laws amplify error signals and add feed-forward terms to create command signals. Control laws such as PID (Proportional-Integral-Derivative) control laws are widely used because of their general purpose design. As used herein, the term a PID type control laws encompasses all variations and combinations of the PID compensator, including P, PI and PD configurations. A PID type control law is so named because its control output is derived from a weighted sum of a term proportional the input, another proportional to the integral of the input, and another proportional the derivative of the input. The PID type control law controls in a proportional control mode, integral control mode, and differential control mode simultaneously so that the system reaches a target value in a stable state within as fast a period of time as is possible. Such control laws include a proportional amplification unit with a proportional gain parameter $K_P$, an integration unit with an integration gain parameter $K_I$ and a derivative unit with a derivative gain parameter $K_D$.

Tuning a control law is the process of setting or adjusting the control law gains (e.g., $K_P$, $K_I$, $K_D$) of the control law to achieve desired performance. For example, since the stability of a motion controller may vary due to the interaction with load condition, gains of the control law must be tuned (i.e., adjusted) regularly to operate effectively in a specific application of the controller. Control laws that are poorly tuned either act too aggressively or too sluggishly, or with insufficient margins of stability. When the uncertainty in the disturbance or process dynamic characteristics is large, the tuning of a control law is often difficult. As a result, the tuning process in the past has usually required a highly experienced technician who tuned the system manually. However, while manual tuning of a controller is possible, it is often tedious and results are often non-optimal A Dynamic Signal Analyzer (DSA) is commonly used to perform a frequency response analysis which can provide a frequency domain tuning The DSA generates a multi-frequency signal which can be injected into the control system as a command. The response to the injected signal is returned to the DSA and analyzed often employing a Bode-Plot. A DSA unit, however, is relatively expensive. Moreover, the number of points available to the DSA for injecting test signals is often fewer than desired. As a result, the use of such equipment is usually limited to the research laboratory and is not generally available at the user site.

BRIEF SUMMARY OF THE INVENTION

The above-identified problems are solved and a technical advance is achieved in the art by providing a method and system that perform an auto-tuning of a motor controller based on a frequency response function.

The invention can be implemented in numerous ways, including as a system, a device/apparatus, a method, or a computer readable medium. Several embodiments of the invention are discussed below.

An embodiment comprises a method of determining an optimal tuning parameter set for use in tuning a controller used in a process control loop with a plant (motor and associated load), the method comprising: (a) providing a predefined region on a gain vs. phase plot that encompasses insufficient margins of stability; (b) providing a predefined cost function associated with the region, wherein the cost function represents a cost for stability based on a relative depth of penetration of the region; (c) applying an excitation test signal containing components that span over a predefined range of frequencies to the control system and receiving frequency response data of the control system in response to the excitation test signal to obtain a plant measurement; (d) searching a plurality of tuning parameter sets to identify an optimal tuning parameter set having a minimal cost based on simulated response data with respect to the plant measurement for each tuning parameter set searched and applying the cost function to the simulated response data; and (e) outputting the optimal tuning parameters.

Further embodiments comprise associating an additional cost function based on a comparison of simulated response data to a target response, an additional cost function based on a disturbance response, an additional cost function based on a sensor noise response. A total cost may thereafter be based on the weighted sum of all cost functions. The target may be an ideal response, a flat closed-loop bode plot at 0 dB, 0 degrees phase for all frequencies of interest.

The region may be defined with respect to phase and gain margins. For example, a center of the region is at 0 dB and 180 degrees on the gain vs. phase plot wherein phase is in degrees on an x-axis and gain is in dB on a y-axis of the plot. In a more specific embodiment, four points on a boundary of the region in (x, y) coordinates are (GM db, 180 degrees), (–GM dB, –180 degrees), (0 db, –180+PM degrees), and (0 dB, –180+PM degrees). The boundary of the region may be scaled to be larger or smaller. The region may take on the shape as to be substantially an ellipse. Other shapes are contemplated herein.

In a still further embodiment, a hard cost for stability may be used for any penetration of the region. Alternately, a soft cost for stability may be used such that the soft cost is defined as a function of coming near to as well as a depth of penetration of the region by the simulated response data. For example, the soft cost may be defined as a function of penetration at a deepest point or a weighted average of penetrations.

Generally, initial tuning parameters may be tuned for stable operation with a low response to allow the system to be excited so that frequency response data can be gathered for tuning the controller by applying a low frequency sinusoid to the control system to determine a motor acceleration constant of a motor and a load.

An excitation test signal may be generated via one or more of random noise generators, devices that generate a continuous stream of random values, pseudo-random binary generators, devices that generate a rich signal by generating two values of varying duration, swept sine generators, devices that generate a continuous sweep of sinusoids, discrete sine wave generators, devices that generate a series of sinusoids typically increasing or decreasing geometrically, and chirp generators, devices that generate a repeated series of sinusoids of rapidly increasing frequency such as K×sin(wt*kt+Const). It may also be applied together with a normal command signal or to measure command response or disturbance response.

In embodiments, tuning parameters may comprise one or more of proportional, integral and derivative gains of the controller. Also, tuning parameters may comprise one or more of filters. Moreover, tuning parameters may comprise a proportional controller for the position controller and another proportional, integral controller for the velocity.

Frequency response data may be obtained using a Fast Fourier Transform (FFT) or a Discrete Fourier Transform (DFT), or other methods known in the art.

The method may further include adjusting the tuning parameters for a current tuning configuration based on the optimal tuning parameters.

Another embodiment comprises an auto-tuning system for a controller of a motor control system comprising: (a) a signal generator for an excitation test signal over a predefined range of frequencies to the control system; (b) a data recorder for receiving and recording frequency response data of the control system in response to the excitation test signal; (c) a gain controller for adjusting gains of the controller; (d) a computing device interfaced with the signal generator, the gain controller, and the data recorder, said computing device programmed to: (i) access a predefined region on a gain vs. phase plot that encompasses insufficient margins of stability; (ii) access a predefined cost function associated with the region, wherein the cost function represents a cost for stability based on a relative depth of penetration of the region; (iii) instruct application of an excitation test signal containing components that span over a predefined range of frequencies to the control system and receiving frequency response data of the control system in response to the excitation test signal to obtain a plant measurement; (iv) search a plurality of tuning parameter sets to identify an optimal tuning parameter set having a minimal cost based on simulated response data with respect to the plant measurement for each tuning parameter set searched and applying the cost function to the simulated response data; and (v) output the optimal tuning parameters. The computing device may further be programmed to instruct the gain controller to adjust the tuning parameters for the current tuning configuration based on the optimal tuning parameters. The computing device may further be programmed to execute the methods described herein.

As a tangible computer readable medium, an embodiment provides for tuning a process control loop having a controller comprising instructions to be executed on a processor that: (i) access a predefined region on a gain vs. phase plot that encompasses insufficient margins of stability; (ii) access a predefined cost function associated with the region, wherein the cost function represents a cost for stability based on a relative depth of penetration of the region; (iii) instruct application of an excitation test signal containing components that span over a predefined range of frequencies to the control system and receiving frequency response data of the control system in response to the excitation test signal to obtain a plant measurement; (iv) search a plurality of tuning parameter sets to identify an optimal tuning parameter set having a minimal cost based on simulated response data with respect to the plant measurement for each tuning parameter set searched and applying the cost function to the simulated response data; and (v) output the optimal tuning parameters. The computer readable medium may further comprise instructions to be executed on a processor that adjust the tuning parameters based on the optimal tuning parameters. The computer readable medium may further comprise instructions to execute the methods described herein As a method, an embodiment includes a method of determining tuning parameters for use in tuning a controller used in a process control loop, including: (a) providing tuning parameters as a current tuning configuration for the control system; (b) applying an excitation test signal containing components that span over a predefined range of frequencies to the control system; (c) receiving frequency response data of the control system in response to the excitation test signal to determine phase and gain margins; (d) creating an instability region defined by a bounded area that connects the phase and gain margins with a boundary on a gain vs. phase plot; and (e) computing stability determinations with respect to the instability regions. Thereafter, the tuning parameters can be adjusted for the current tuning configuration based on the stability determinations as well as other factors. For example, the tuning parameters can be adjusted for the current tuning configuration based on whether frequency response data plotted on the gain vs. phase plot penetrates the instability region defined by the bounded area. Moreover, the steps (b) through (e) can be repeated to obtain an optimized controller parameter set.

In a further embodiment, the proposed tuning parameters can be initially tuned for stable operation with a low response to allow the system to be excited so that frequency response data can be gathered for tuning the controller by applying a low frequency sinusoid to the control system to determine a motor acceleration constant of a motor and a load. By simulating the system based on the motor acceleration constant, an initial set of tuning parameters can be calculated. Tuning parameters can include one or more of proportional, integral and derivative gains of the controller or one or more of filters. The tuning parameters can also include a proportional controller for the position controller and another proportional, integral controller for the velocity. Applying tuning at this stage will reduce the amount of motion in subsequent tests, described below. This initial tuning can be skipped when the reduction of motion in subsequent tests is not required of if the user wishes to skip this step (ex. to save time), without loss of ultimate tuning accuracy.

In a still further embodiment, the instability region defined by a bounded area can have the following features. For example, a center of the bounded area can be placed at 0 dB and 180 degrees on the gain vs. phase plot wherein phase is in degrees on an x-axis and gain is in dB on a y-axis of the plot. Moreover, four points on the bounded area in (x, y) coordinates can be (GM db, 180 degrees), (−GM dB, −180 degrees), (0 db, −180+PM degrees), and (0 dB, −180+PM degrees). This boundary of the bounded area may be used to define a minimal stability requirement for adjustment of the tuning parameters. This bounded area can thereafter be scaled to be larger than the defined coordinates to allow greater margins of stability or smaller than the defined coordinates to allow lesser margins of stability. In one example, the bounded area can be shaped substantially as an ellipse. Other shapes for the bounded area are contemplated herein.

A further embodiment can also provide for calculating a cost for stability of the current tuning configuration based on open and closed loop responses. This cost can be a hard cost for stability, used for any penetration of the instability region defined by the bounded area. Or, this cost can be a soft cost for stability, used such that the soft cost is defined as a function of coming near to as well as a depth of penetration of the bounded area by the frequency response data plotted on the gain vs. phase plot. For example, the soft cost can be defined as a function of penetration at a deepest point or a weighted average of penetrations. The can also be a cost for response that accounts for how well an actual response of the control system matches a target response. Such a cost for response can account for how well an actual response of the control system matches a target response, wherein the target is ideal response, a flat closed-loop bode plot at 0 dB, 0 degrees phase for all frequencies of interest. Moreover, the ideal response could be specified as a particular desired response, such as a flat closed-loop Bode plot at 0 dB, 0 degrees phase for frequencies up to a specified bandwidth, then the closed-loop response would drop in amplitude at a specified rate. Such a tailored closed-loop frequency response could be specified so that the electro-mechanical system did not cause harm or objectionable acoustic or vibratory noise into the immediate environment. These costs can be combined into a total cost that is the weighted sum of the cost of stability and the cost of response.

In a still further embodiment, the excitation test signal can be generated via one or more of random noise generators, devices that generate a continuous stream of random values, pseudo-random binary generators, devices that generate a rich signal by generating two values of varying duration, swept sine generators, devices that generate a continuous sweep of sinusoids, discrete sine wave generators, devices that generate a series of sinusoids typically increasing or decreasing geometrically, and chirp generators, devices that generate a repeated series of sinusoids of rapidly increasing frequency such as K×sin(wt*kt+Const). Also, the excitation test signal can be applied together with a normal command signal. Moreover, the excitation test signal can be applied to measure command response, torque, sensor noise, or other disturbance responses.

Other options may include providing a display for displaying the frequency response, the Bode plot, the gain vs. phase plot, the instability region, and the like. The frequency response data can be obtained using a Fast Fourier Transform (FFT) or a Discrete Fourier Transform (DFT) or the like.

As a system, an embodiment includes an auto-tuning system for a controller of a motor control system having (a) a signal generator for an excitation test signal over a predefined range of frequencies to the control system; (b) a data recorder for receiving and recording frequency response data of the control system in response to the excitation test signal; (c) a gain controller for adjusting gains of the controller; and (d) a computing device interfaced with the signal generator, the gain controller, and the data recorder, said computing device programmed to accomplish the methods of the invention as described herein such as but not limited to being programmed to (i) instruct the gain controller to set tuning parameters as a current tuning configuration for the control system; (ii) instruct the signal generator to apply an excitation test signal over a predefined range of frequencies to the control system; (iii) receive from the data recorder frequency response data to determine phase and gain margins; (iv) create an instability region defined by a bounded area that connects the phase and gain margins with a boundary on an open loop gain vs. phase plot; and (v) instruct the gain controller to adjust the tuning parameters for the current tuning configuration based on stability determinations with respect to the instability regions.

As a tangible computer readable medium, an embodiment of the invention includes computer instructions embodied on the medium for tuning a process control loop in accordance with the methods described herein. For example, such instructions are adapted to be executed on a processor to (a) optionally instruct a gain controller to set initial tuning parameters as a current tuning configuration for the control system; (b) instruct a signal generator to apply an excitation test signal over a predefined range of frequencies to the control system; (c) receive frequency response data of the control system in response to the excitation test signal to determine phase and gain margins; (d) create an instability region defined by a bounded area that connects the phase and gain margins with a boundary on an open loop gain vs. phase plot; and (e) instruct the gain controller to adjust the tuning parameters for the current tuning configuration based on stability determinations with respect to the instability regions. The computer readable medium may include a number of software components, such as a logic processing module, configuration file processing module, data organization module, and data display organization module, that are embodied upon the computer readable medium.

Other and further aspects of the present invention will become apparent during the course of the following detailed description and by reference to the attached drawings.

All patents, patent applications, provisional applications, and publications referred to or cited herein, or from which a claim for benefit of priority has been made, are incorporated herein by reference in their entirety to the extent they are not inconsistent with the explicit teachings of this specification, including control systems and tuning processes described in U.S. Pat. Nos. 5,656,906, 5,834,918, 6,081,751, 6,198,246, 6,281,650, 6,510,353, 6,658,370, 6,622,099, 6,847,598, 6,917,049, 6,961,628, 6,980,869, 7,292,001, 7,190,144, 7,035,694, and published U.S. Application Nos. 2002/0019715 and 2002/0022903.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

It should be understood that in certain situations for reasons of computational efficiency or ease of maintenance, the ordering of the blocks of the illustrated flow charts could be rearranged or moved inside or outside of the illustrated loops by one skilled in the art. Optional steps can be removed or substituted.

DETAILED DESCRIPTION OF THE INVENTION

Figure 1:
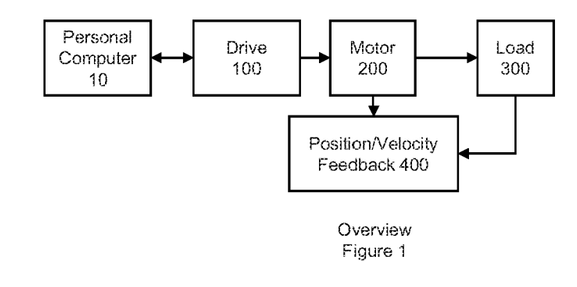
FIG. 1 illustrates an overview of a motor control system in which a built-in auto-tuning system is implemented as an embodiment of the present invention.

FIG. 1 illustrates an overview of a motor control system in which an auto-tuning system is implemented. The motor control system includes a drive 100, a motor 200, driving a load 300 and a position and/or velocity measuring device 400. It should be understood that there are many variations of the feedback structure including a single position sensor on the motor, a single position sensor on the load, a combination of a position sensor on the motor and another on the load, all of which are included herein. It should be understood that velocity can be measured directly on the motor, the load or both rather than being calculated from a position sensor. This configuration is also included herein. It should be understood that position and velocity can be calculated using "sensorless" techniques which use the characteristics of the motor to sense position and velocity. This configuration is also included herein.

Figure 2:
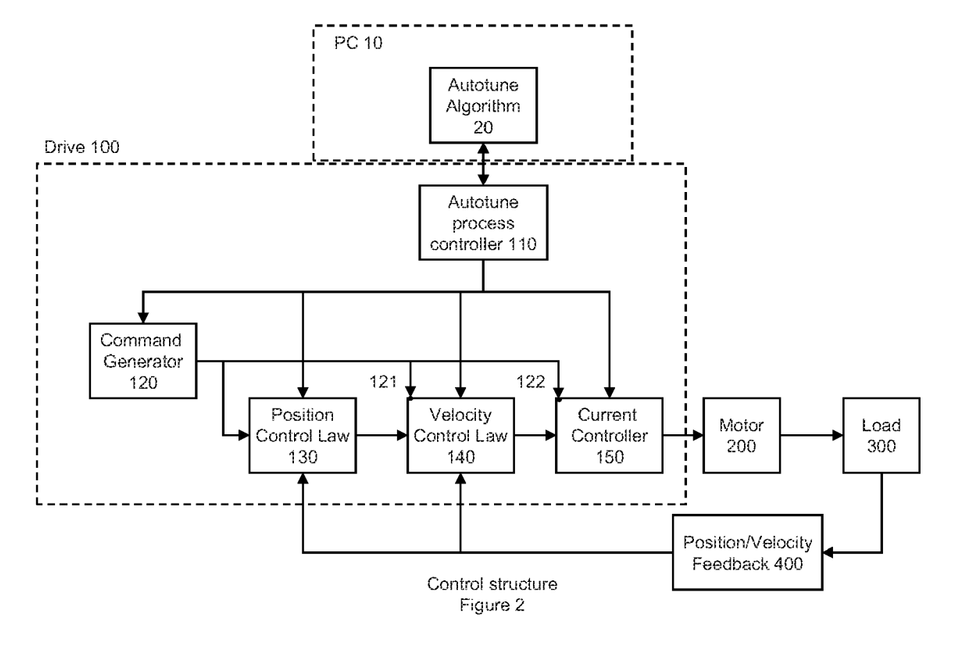
FIG. 2 is a block diagram of an exemplary embodiment of the auto-tuning system as shown in FIG. 1.

FIG. 2 shows a view of the control structure. Command generator 120 generates position, velocity, and acceleration command signals and communicates them to position control law 130, velocity control law 140, and current controller 150. A feedback system includes a control law that generates an excitation command, a power converter that creates excitation, a plant (motor and associated load) which is the object of control, and a sensor that measures one or more control variables. The command generator 120 is connected to the position controller of the motor control system through command and response paths. Upon receiving commands from the command generator 120, the position controller generates a velocity command for the velocity controller which in turn generates a current command for the current controller. The position feedback feeds back the position and velocity information from the motor 200 to the current controller, velocity controller and position controller where the feedback output is subtracted from a reference input to form an error signal. Controller commands are also used to augment loop performance through feed-forward paths for velocity 121 and current/acceleration 122.

It should be understood that there are many current control strategies and many motor types that can be used in precision applications. These configurations are included herein. It should also be understood that there are many configurations of control laws such as position/velocity loops, a position loop without a velocity loop, a velocity loop without a position loop, a force/velocity loop, a force loop only, and others. These are also included herein. It should be understood that there are many representations and variations of position, velocity, and torque loops including s-domain, z-domain, and state space. These are all included herein. It should be understood that there are many configurations of command generation including generation of command on the drive, generation of command on a separate computational device and communication to the drive on a regular real-time interval, generation of command on a multiple axis controller and communication of that command set to a set of drives, following a pulse train such as a step/direction command or encoder signal. These can also be combined such as following a command generation on the drive summed with following an encoder signal. These are all included herein. It should be understood that there are many combinations and types of feed-forward including velocity feed-forward, acceleration feed-forward, static friction feed-forward, stiction feed-forward etc. These feed-forward paths are all included herein.

The control system in FIG. 2 further includes an auto-tune controller 20 which is configured to perform an auto-tuning of the control system and is executed, for example, on a personal computer 10 or other processing device. The auto-tune controller is connected to the drive through the Autotune process controller 110. The autotune process controller provides access to the command generator, the position control law, the velocity control law, the current controller and internal signals such as position command, position feedback, position error, velocity command, velocity feedback, velocity error, current command, current feedback, current error, etc. It should be understood that the drive is often a powerful computational device and part or all of the autotune algorithm can be executed on the drive. Also, the autotune algorithm can be executed on many computational devices such as multiple axis motion controllers, programmable logic controllers, etc., all of which are included herein.

Figure 3:
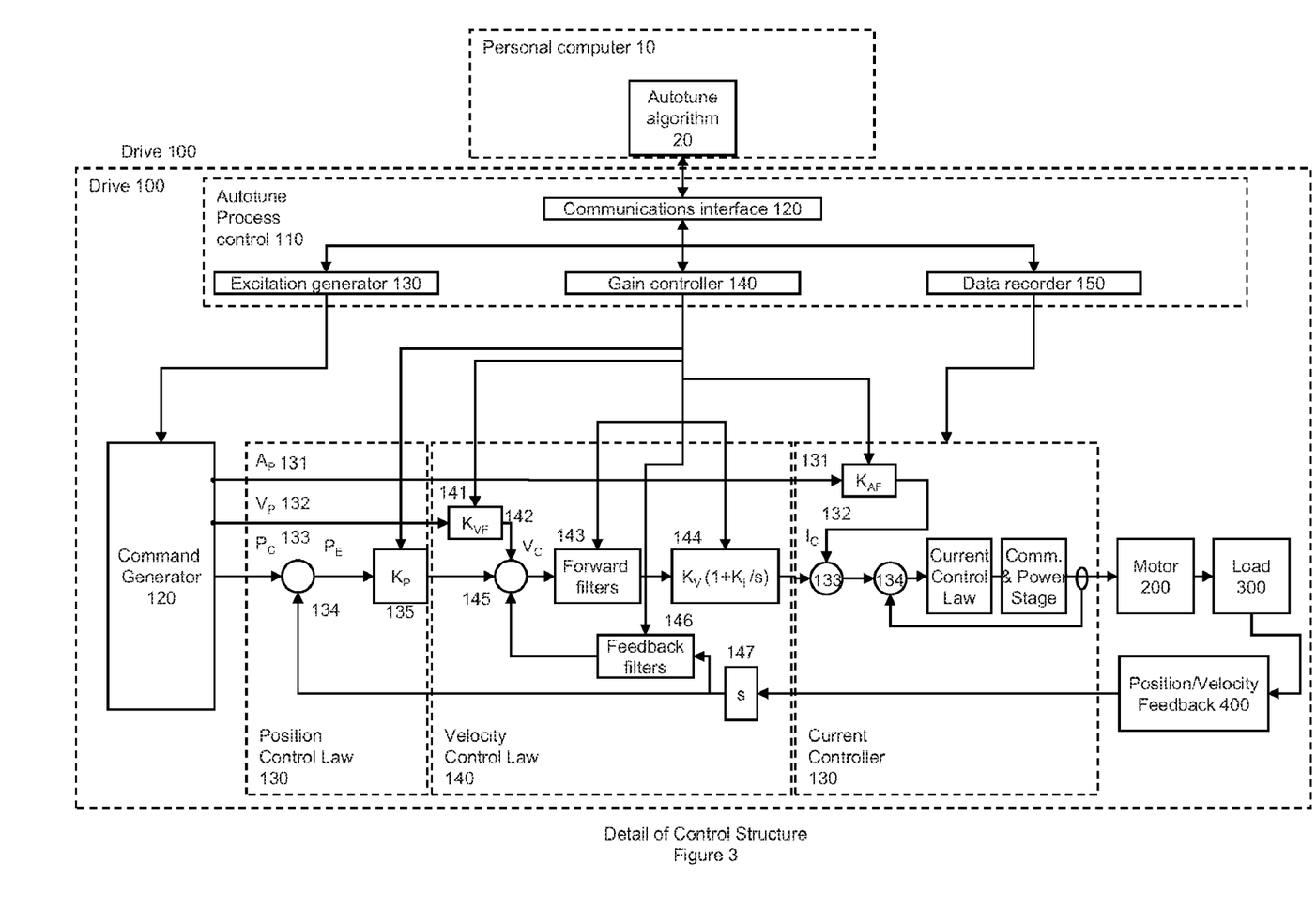
FIG. 3 is an exemplary embodiment of the auto-tuning algorithm and control system.

FIG. 3 shows a detailed diagram of the control algorithm FIG. 2. The autotune algorithm executes on the Personal Computer/Computing Device 10 and communicates with the drive via the communications interface 120. Through that interface, it can control the excitation generator 130, modify gains through the gain controller 140 and record and retrieve data though the data recorder 150.

The excitation generator 130 can disable or enable the command generator 120. During data collection, the command generator can be disabled and the excitation generator can create the command set needed to collect data. It creates position command 133, velocity command 132, and acceleration command signals 131. Outside periods of data collection, the command generator is enabled to create command signals independently of the autotune algorithm.

The command generator is adapted to generate signals with rich frequency content, which is to say signals that contain significant components of frequency from most or all of the operating frequency spectrum. Command signals can be of many types including random noise generators which are devices that generate a continuous stream of random values, pseudo-random binary generators which are devices that generate a rich signal by generating two values (typically maximum and minimum allowed current) of varying duration, swept sine generators which are devices that generate a continuous sweep of sinusoids, discrete sine wave generators which are devices that generate a series of sinusoids typically increasing or decreasing geometrically, and chirp generators which are devices that generate a repeated series of sinusoids of rapidly increasing frequency such as K×sin(wt*kt+Const). It should be understood that there are many ways to generate rich excitation signals, all of which are included herein.

The command signal can be applied to current, velocity, or position signals. There are many ways to inject the command into the loop. When measuring command response, it is important to maintain the integral relationship between acceleration and velocity, and between velocity and position. The signal can also be injected directly to current command where it becomes a good representation of a torque disturbance. In this case, the approximate disturbance rejection of the control loop can be measured. Excitation signals applied to both the command and disturbance are included herein.

The position control law receives the position command and the position feedback and scales it through $K_P$ to create a velocity command. The position loop sometimes includes other terms such as an integral term or a derivative term. The position feedback, command, and error signals can be processed by one or more filters which are not shown in FIG. 3 but are familiar to those of ordinary skill in the art. These filters can be in the forward path which is between the position control law. These filters can also be in the feedback path which is between the position feedback signal and the position control law. It should be understood that position controllers can include observers, techniques that improve the quality of the position signal. A position controller with an observer is included herein.

The velocity control law receives a velocity command and a velocity feedback and a velocity-feed-forward command and creates an error signal. This error signal can be processed by one or more filters in the forward path 143 and a control law 144. The velocity feedback signal is created using a differentiator 147 the can be processed by one or more feedback filters 146. There are many filter types including low pass, notch, resonators, etc. that can be applied to the velocity signals. These filters can greatly improve the response/stability of the tuning. Generally, the most complex part of tuning is the selection and setting of filters and velocity control law gains. The automatic setting of these variables is a focus herein although the method and system herein can be used to tune filters, control law gains, and feed-forward gains in any portion of the control system. It should be understood that velocity controllers can include observers, techniques that improve the quality of the velocity signal. A velocity controller with an observer is included herein.

The output of the velocity control law is current command which can be augmented with a current feed-forward signal to create current that is applied to the motor using commutation and a power stage.

Figure 4A:
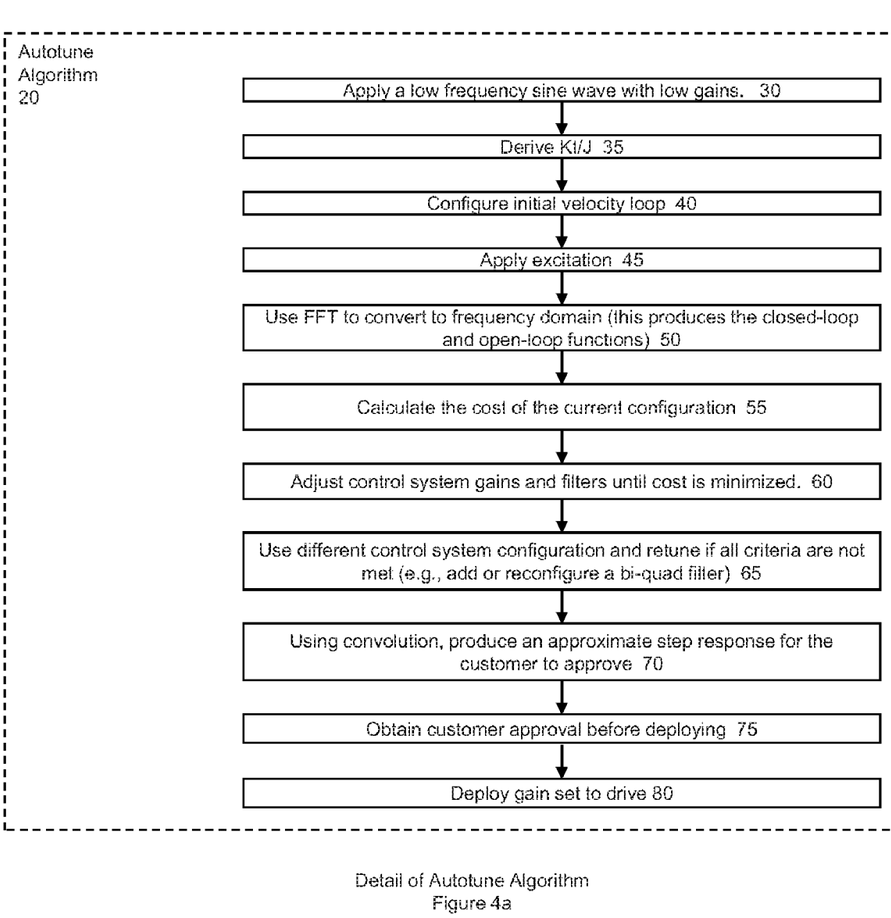
FIG. 4a-b are flow charts of an example of an auto-tuning algorithm.
Figure 4B:
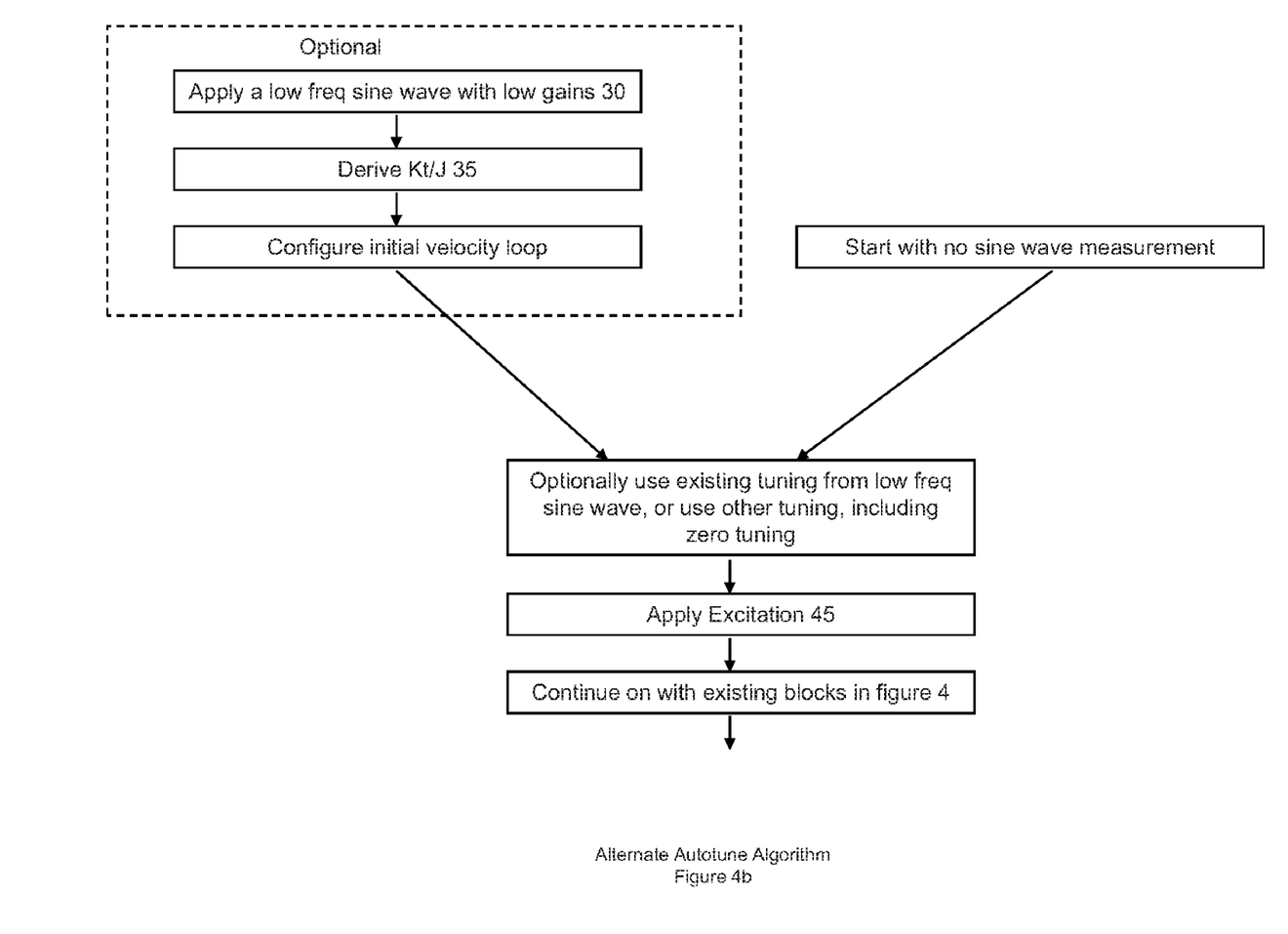

FIG. 4 shows a detailed view of an exemplary embodiment of the autotune algorithm. The proposed tuning parameters can be initially tuned for stable operation with a low response to allow the system to be excited so that frequency response data can be gathered for tuning the controller by applying a low frequency sinusoid to the control system to determine a motor acceleration constant of a motor and a load. By simulating the system based on the motor acceleration constant, an initial set of tuning parameters can be calculated. Tuning parameters can include one or more of proportional, integral and derivative gains of the controller or one or more of filters. The tuning parameters can also include a proportional controller for the position controller and another proportional, integral controller for the velocity. Applying tuning at this stage will reduce the amount of motion in subsequent tests, described below. This initial tuning can be skipped when the reduction of motion in subsequent tests is not required of if the user wishes to skip this step (ex. to save time), without loss of ultimate tuning accuracy. For example, first a low frequency sinusoid 30 is applied to the control system to determine the motor acceleration constant of the motor and load, which for the motor in FIG. 4, is approximately a constant multiplied by current 35. It then configures the initial velocity loop for stable operation typically with low gains to ensure stability but producing only low response 40. The initial tuning allows the system to be excited so data can be gathered to complete the autotuning process.

The auto-tune process then applies excitation 45 and directs the drive to record several signals, retrieves those signals and then processes those signals to measure the frequency response of the system using the Fast Fourier Transform (FFT) 50. There are many ways to translate time domain data to frequency domain data including FFTs and Discrete Fourier Transforms (DFTs) which will be familiar to those of ordinary skill in the art.

One signal that is measured or simulated is the open loop response. The open loop response has two characteristics, the open loop gain, which is the magnitude of the response divided by the command at each frequency of interest, and the open loop phase, which represents the delay or advance of the response compared to the command at each frequency of interest. The open loop measures the total processing of the control system as the signal traverses the entire loop, for example, if excitation were generated solely as current command 133 the path from the output of summing junction 133 returning to the input of junction 133. The open loop response can also be calculated from the closed loop response; the closed loop response is the comparison of the command and response, for example, the response of position feedback 134 to position command 133. The means of these calculations are well-known to those of ordinary skill in the art.

If the open loop measurement is not able to be directly measured initially, it can be simulated from a plant measurement and simulation of controller gain responses. The plant measurement is calculated by exciting the system with a signal rich in frequencies. The excitation can be inserted at many places in FIG. 3, including 133, 120. The plant response is the response of the excitation at 134 (just before the "Current Control Law" block) divided by the excitation at 134 (summing junction in the "Position Control Law" region). The simulated open loop response can be calculated from the measured plant response considered with the control loop gains in blocks (Forward filters), (Kv(1+Ki/s)), (Feedback filters), and (Kp). Simulating the open loop response from the plant and controller gains will be well-known to those of ordinary skill in the art.

The open and closed loop responses can be used to measure a cost of the current response. The cost is a combination of margins of stability, where higher margins imply lower cost, and response, where minimal cost occurs when the actual response best matches a target response. For stability, two well-known figures of merit are gain margin and phase margin. Gain margin (GM) is negative of the gain of the open loop system at the frequency where the open loop phase is 180 degrees. Phase margin is defined as 180 degrees minus the open-loop phase at the frequency where the open loop gain is 0 dB. A GM/PM pair is often defined as the desired set of margins; for example, 60 degrees PM and 10 dB GM. Moreover, additional responses, such as sensitivity (sensitivity+closed loop=1), torque disturbance response (response of system position compared to a torque disturbance), or sensor noise response (response of system torque command compared to encoder noise) can also be used in place of, or in addition to the open and closed loop responses to create a cost of the current response. Measurements added here are well known to those skilled in the art.

Figure 5A:
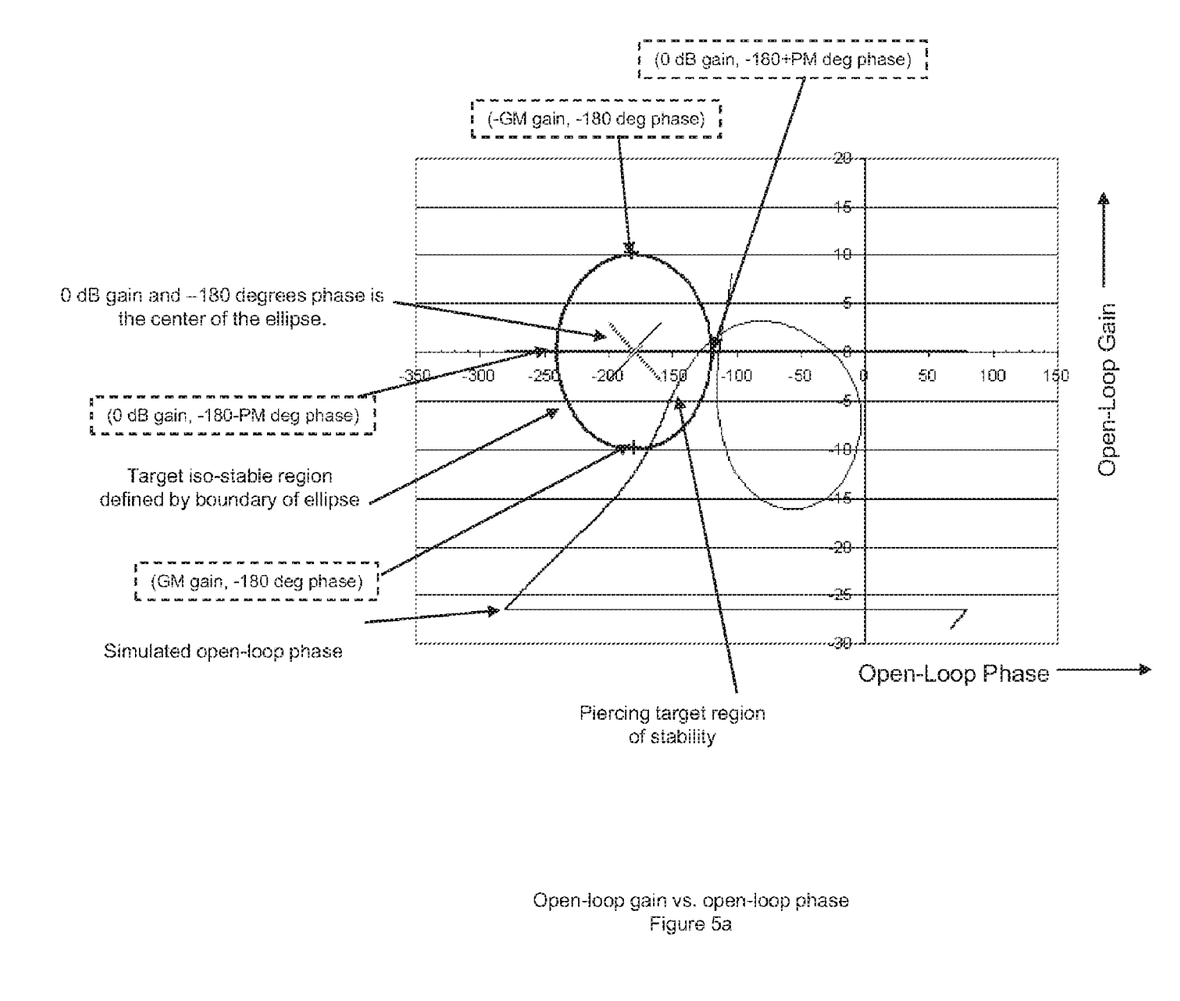
FIGS. 5a-5b are example iso-stable regions (open-loop-gain-vs-open-loop-phase plot).

A region is defined on a gain vs. phase plot that encompasses insufficient margins of stability. If open loop gain is plotted against open-loop phase, an ellipse (for example) can be used to identify zones of approximately equal stability (iso-stable regions) shown in FIGS. 5a and 5b. The center of the ellipse is 0 dB and 180 degrees on that plot. Four points on the ellipse in (x, y) coordinates shown in FIG. 5 would be (GM dB gain, 180 degrees phase), (−GM dB gain, −180 degrees phase), (0 dB gain, −180+PM degrees phase), and (0 dB gain, −180-PM degrees phase). Iso-stabile regions can be defined by scaling the ellipse to larger (greater margins of stability) and smaller (lesser margins of stability). The axes of FIG. 5a are phase (x-axis) and gain (y-axis). When phase is −180 degrees gain is 0 dB, the system is unstable. It is well known that this condition should be avoided. If the phase margin and gain margin points are connected using an ellipse, that boundary of that ellipse is an iso-stability shown in FIG. 5a. An iso-stable region can be used to define the target minimal stability requirements that a parameter set can demonstrate without cost.

Figure 5B:
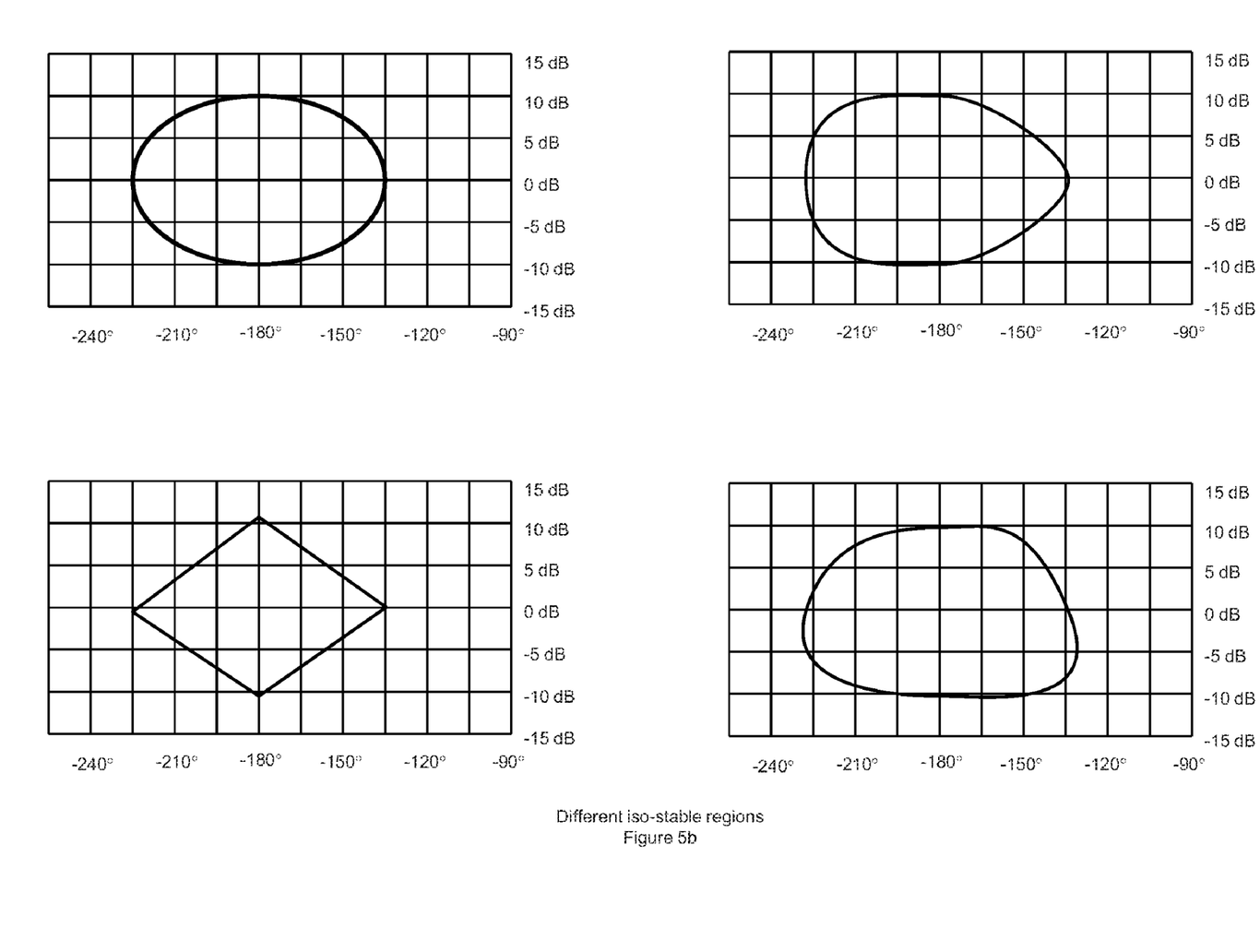

A stability penalty can be imposed when the open-loop-gain-vs.-phase plot crosses into the target iso-stable zone; in such a case, the open-loop plot "pierces" the iso-stable zone as shown in FIGS. 5a and 5b. A "hard" cost function can be used where any piercing is unacceptable. A soft cost function can be used when the cost of stability can be defined as a function of how deeply the open-loop phase/gain plot pierces the desired iso-stable region, either at its deepest point or a weighted average of all piercing.

The soft cost function creates a finite cost penalty that is applied for crossing into the region of insufficient stability margin. This differs from a method that would not allow the system to cross into the region of instability, which is in effect an infinite cost penalty for crossing. In this way, slight violations of the region boundaries can be balanced against improvements in performance so that a point of acceptable performance and stability may be located more reliably. The proximity to the region can subtract from the score and the bandwidth can add to the score. The combination of stability and bandwidth scores can determine a total score, which may be used for the solution. Thereafter, control system gains and filters can be adjusted until stability criteria are met at the highest possible bandwidth. (However, if the bandwidth is above a preferred upper limit, it can thereafter be reduced).

Figure 6:
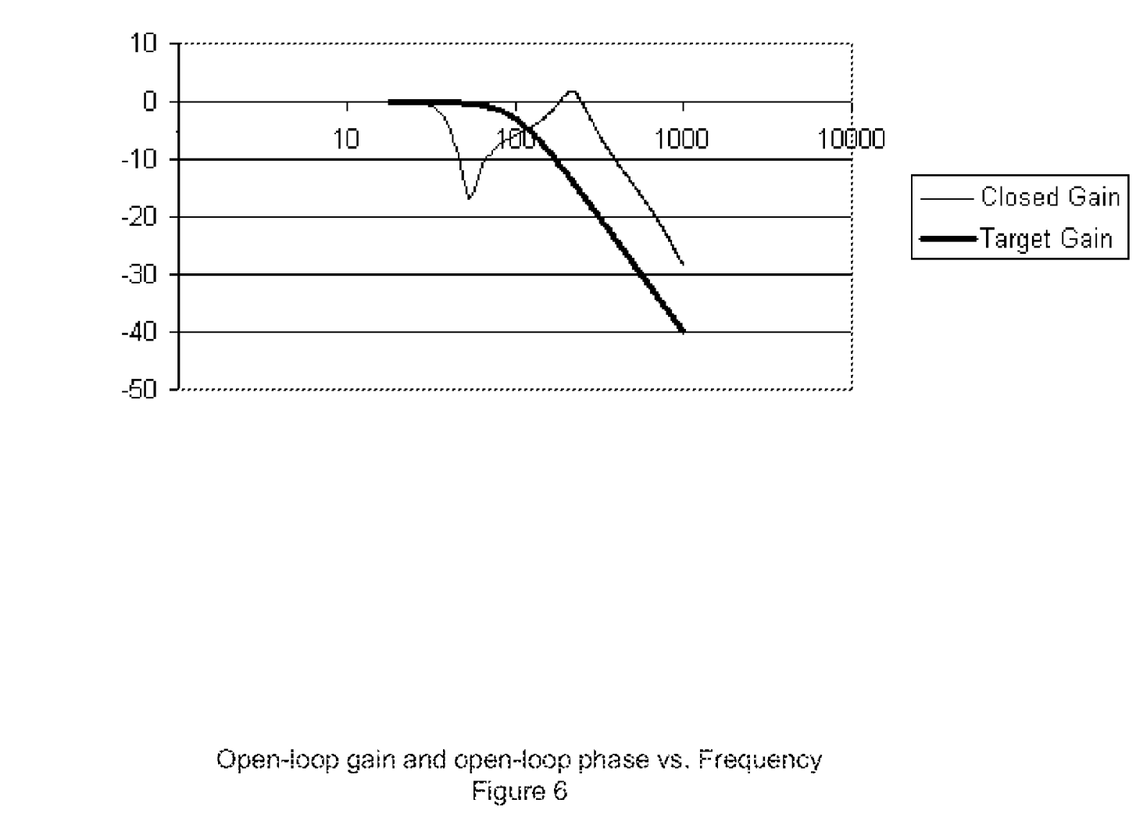
FIG. 6 is a frequency domain plot comparing an example target gain-vs-frequency plot and an actual gain-vs-frequency plot of the closed loop command response.

Cost also can account for how well the actual response of the system matches the target response; the larger the difference between the target and actual, the higher the response cost. Sometimes applications require that the system respond as fast as possible; in such a case, cost can be a measurement of how far the system response is from a perfect response (command=feedback). In other cases, applications require limited response, so the controller must essentially filter the command, for example, to reduce vibration or shock. In this case the ideal response may be a low-pass filter and the cost is how far the system response is from the desired response, whether it is too responsive or not responsive enough. This case is shown in FIG. 6 by plotting target vs. actual closed-loop gain vs. frequency. The response cost can be calculated from disturbances response or command response or a combination of both; in an embodiment it is the response to command.

Cost can account for the resistance of the system to move in response to an external torque applied to the system (disturbance response). It is usually desirable for the system to resist deflection due to external torque disturbances (ex. an airplane flying in a straight line subject to varying crosswinds). Some methods of improving disturbance response adversely affect other desirable characteristics of the system, such as its closed loop response or stability. Scoring the disturbance response separately allows consideration of the disturbance response in the system as a whole.

Cost can account for the amount of torque applied to the motor in response to noise on the feedback sensor (sensor noise response). It is usually desirable for the system to command little torque in response to any noise on the feedback sensor, resulting in less energy consumption and acoustic and vibratory noise. Some methods of improving sensor noise response adversely affect other desirable characteristics of the system, such as its closed loop response or stability. Scoring the sensor noise response separately allows consideration of the sensor noise response in the system as a whole.

Costs, such as referenced in above can be calculated in different ways, including calculating the distance above or below a threshold (threshold can be a single value or a target curve varying at different frequencies) at each data point in the frequency range of measurement and summing all the distances to determine the cost. Moreover, the behavior of the cost can be modified by calculating the summing of the distance to a power (sum[distance^power]) for all data points in the frequency range of measurement. Increasing the power used will increasingly emphasize any deviation from the target response. Moreover, costs can be weighted differently above and below a closed loop frequency response target. For example, we may wish to emphasize closed loop response below the frequency response more (by way of applying a higher multiplier to cost components below the closed loop frequency response target and a lower multiplier below the frequency response target) and emphasize sensor noise cost above the frequency response target (applying a lower multiplier to cost component below the frequency response target and a higher multiplier above the frequency response target).

The total cost is the weighted sum of the cost of one or more of the following (for example): stability, closed loop response, disturbance response, and sensor noise response.

After the cost is calculated for the first set of tuning parameters, more sets may be calculated and the process may be repeated. The algorithm 60 searches through many sets of tuning parameters to identify the tuning set with the minimal costs. There are many searching strategies including: 1) exhaustive search of parameters sets and strategies that search cost values, 2) genetic algorithms the determine optimal cost by adjusting genetic markers in order to find an optimal cost, 3) Newtonian search algorithms that consider the trend of changes in the cost to converge to the optimal cost, 4) local optimization of one parameter at a time until all parameters are determined, 5) variations of the above search methods where areas of search are skipped, due to knowledge about the behavior of control systems ensuring a lower cost solution in the skipped area will not occur.

If the minimal cost is still unacceptably high, the algorithm can reconfigure the loop, for example adding or modifying the configuration of a filter, changing the configuration of the position control law, and changing the configuration of the velocity control law. The previous step is repeated and the search can proceed finding the minimum cost with that combination.

If the cost is above a minimal cost determined ahead of time, the tuning could be declared invalid. This would ensure that when an acceptable set of tuning parameters is not able to be found, then the tuning parameters would not be loaded to the controller or reported to the user if tuning parameters are not stable or otherwise inappropriate.

The user can be shown the frequency response directly. Also, the step response can be calculated from the closed-loop frequency response. This can be done by convolving 70 the frequency response with 1/s function (the frequency-domain representation of a step function). This can provide the user both time- and frequency-domain predictions of system response before deploying the solution to the system.

After the user has reviewed the estimates, the user can be consulted 75 before allowing the parameter set to be downloaded to the drive. This reduces the likelihood that there will be problems on the machine that could have been predicted when the time- and frequency-domain predictions of system response were displayed for the user.

After obtaining user approval, the gain set can be deployed to the drive 80 via the communications interface 120 to the Gain controller 140.

The inventive method and system described above provide many advantages for the quality control of a motor control system. The operator of the tuning system needs little special controller tuning education and controller tuning is fully reproducible (e.g., two different operators can get the same result). Moreover, the controller tuning can be optimized for specific mechanical behaviors like resonance, friction and inertia etc. Additional advantages include the following: if the target response is not defined, the controller searches for the highest bandwidth available target response, controller update relies on comprehensive information obtained about the control system, information obtained during the process offers insights as to the system's limit of performance, and the time for an auto-tuning is short due to the concentrated nature of the frequency data; this also leads to requiring only small amounts of shaft rotation are for the auto tuning process.

The many features and advantages of the present invention are apparent from the detailed description, and thus, it is intended that the appended claims cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, much of the functionality described above as being provided by the auto-tune controller alternatively could be incorporated into the functionality provided by a chip or a CPU. Moreover, much of the functionality of the position/velocity/current controllers may also be incorporated into a chip or a CPU with the auto-tune controller.

An exemplary system for implementing the invention includes a computing device or a network of computing devices. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as ROM, flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules or other data. Computing device may also have input device(s) such as a keyboard, mouse, pen, voice input device, touch input device, etc. Output device(s) such as a display, speakers, printer, etc. may also be included. Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, RF, infrared and other wireless media.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It should be understood that the examples and embodiments described herein are for illustrative purposes only and that various modifications or changes in light thereof will be suggested to persons skilled in the art and are to be included within the spirit and purview of this application.

The invention claimed is:

1. A method of determining a tuning parameter set for use in tuning a controller used in a process control loop of a control system for a plant having a motor and associated load, the method comprising:
   (a) providing a predefined region on a gain vs. phase plot that encompasses undesirable margins of stability;
   (b) providing a cost function associated with the predefined region, wherein the cost function represents a cost for stability based on a relative position with respect to the predefined region;
   (c) obtaining a plant measurement by receiving frequency response data of the control system in response to an excitation test signal containing components that span over a predefined range of frequencies applied to the control system;
   (d) simulating responses with respect to the plant measurement for each of a plurality of tuning parameter sets to obtain simulated response data;
   (e) applying the cost function to the simulated response data for each of the plurality of tuning parameter sets to obtain a calculated cost for each of the tuning parameter sets;
   (f) selecting a desired tuning parameter set from the plurality of tuning parameter sets, wherein the desired tuning parameter set comprises a selected one of the plurality of tuning parameter sets having a desired calculated cost; and
   (g) outputting the selected one of the plurality of tuning parameter sets for use in the control loop of the control system.

2. The method of claim 1 further comprising associating with the calculated cost an additional cost function for the simulated response data for each of the tuning parameter sets based on one or more of a comparison of simulated response data to a target response, a disturbance response, and a sensor noise response.

3. The method of claim 2 wherein the target response is substantially an ideal response, a flat closed-loop bode plot at 0 dB, 0 degrees phase for all frequencies of interest.

4. The method of claim 2 further comprising applying a predetermined weight to each cost function.

5. The method of claim 1 wherein the desired tuning parameter set comprises the selected one of the plurality of parameter sets having a minimal calculated cost.

6. The method of claim 1 wherein the cost for stability based on the relative position with respect to the predefined region comprises a hard cost for stability for any penetration by the simulated response data into the predefined region.

7. The method of claim 1 wherein the cost for stability based on the relative position with respect to the predefined region comprises a soft cost for stability defined as a function of coming near to as well as a depth of penetration of the predetermined region by the simulated response data.

8. The method of claim 7 wherein the soft cost for stability is defined as a function of penetration at a deepest point or a weighted average of penetrations.

9. The method of claim 1 wherein the predefined region is defined with respect to phase and gain margins.

10. The method of claim 9 wherein a center of the predefined region is substantially at 0 dB gain and −180 degrees phase on the gain vs. phase plot wherein phase is in degrees on an x-axis and gain is in dB on a y-axis of the plot.

11. The method of claim 10 wherein four points on a boundary of the predefined region in (x, y) coordinates are substantially (gain margin GM db gain, 180 degrees phase), (−gain margin GM dB gain, −180 degrees phase), (0 dB gain, −180+phase margin PM degrees phase), and (0 dB gain, −180+phase margin PM degrees phase).

12. The method of claim 11 wherein the boundary of the predefined region substantially represents an ellipse connecting the four points.

13. The method of claim 1 further comprising scaling a boundary of the region to be larger or smaller.

14. The method of claim 1 wherein initial tuning parameters are tuned for stable operation with a low response to allow the control system to be excited so that frequency response data can be gathered by applying a low frequency sinusoid to the control system to determine a motor acceleration constant of the motor and the associated load.

15. The method of claim 1 wherein the excitation test signal is generated via one or more of random noise generators, devices that generate a continuous stream of random values, pseudo-random binary generators, devices that generate a rich signal by generating two values of varying duration, swept sine generators, devices that generate a continuous sweep of sinusoids, discrete sine wave generators, devices that generate a series of sinusoids typically increasing or decreasing geometrically, and chirp generators, devices that generate a repeated series of sinusoids of rapidly increasing frequency.

16. The method of claim 15, wherein said excitation test signal is applied together with a normal command signal.

17. The method of claim 15, wherein said excitation test signal is applied to measure command response or disturbance response.

18. The method of claim 1 further providing a display for displaying a Bode plot of the frequency response data of the control system.

19. The method of claim 1, wherein tuning parameters in the tuning parameter sets comprise one or more of proportional, integral and derivative gains of the controller.

20. The method of claim 1, wherein tuning parameters in the tuning parameter sets comprise one or more of filters.

21. The method of claim 1, wherein tuning parameters in the tuning parameter sets comprise parameters for a proportional controller for a position controller and another proportional, integral controller for velocity.

22. The method of claim 1, wherein frequency response data is obtained using a Fast Fourier Transform (FFT) or a Discrete Fourier Transform (DFT).

23. The method of claim 1 further comprising adjusting the tuning parameters for a current tuning configuration of the control system based on the selected one of the plurality of tuning parameter sets.

24. An auto-tuning system for a controller used in a process control loop of a control system for a plant having a motor and associated load comprising:
   (a) a signal generator for providing an excitation test signal over a predefined range of frequencies to the control system;
   (b) a data recorder for receiving and recording frequency response data of the control system in response to the excitation test signal;
   (c) a gain controller for adjusting gains of the controller;
   (d) a computing device interfaced with the signal generator, the gain controller, and the data recorder, said computing device programmed to:
      (i) access data representing a predefined region on a gain vs. phase plot that encompasses undesirable margins of stability;

(ii) access a cost function associated with the predefined region, wherein the cost function represents a cost for stability based on a relative position with respect to the predefined region;

(iii) obtain a plant measurement by receiving frequency response data in response to application of the excitation test signal;

(iv) simulate responses with respect to the plant measurement for each of a plurality of tuning parameter sets to obtain simulated response data;

(v) apply the cost function to the simulated response data for each of the tuning parameter sets to obtain a calculated cost for each of the tuning parameter sets;

(vi) select a desired tuning parameter set from the plurality of parameter sets, wherein the desired tuning parameter set comprises a selected one of the plurality of tuning parameter sets having a desired calculated cost; and (vii) output the selected one of the tuning parameters sets for use in the control loop of the control system.

25. The system of claim 24 wherein the computing device is further programmed to instruct the gain controller to adjust the tuning parameters for a current tuning configuration based on the selected one of the tuning parameters sets.

26. A tangible computer readable medium for tuning a process control loop having a controller for performing drive control on a plant having a motor and associated load in a control system comprising instructions to be executed on a processor that instruct the processor to:

(i) access data representing a predefined region on a gain vs. phase plot that encompasses undesirable margins of stability;

(ii) access a cost function associated with the predefined region, wherein the cost function represents a cost for stability based on a relative position with respect to the predefined region;

(iii) obtain a plant measurement by receiving frequency response data in response to application of an excitation test signal containing components that span over a predefined range of frequencies;

(iv) simulate responses with respect to the plant measurement for each of a plurality of tuning parameter sets to obtain simulated response data;

(v) apply the cost function to the simulated response data for each of the tuning parameter sets to obtain a calculated cost for each of the tuning parameter sets;

(vi) select a desired tuning parameter set from the plurality of parameter sets, wherein the desired tuning parameter set comprises a selected one of the plurality of tuning parameter sets having a desired calculated cost; and (vii) output the selected one of the tuning parameters sets for use in the control loop.

27. The computer readable medium of claim 26 further comprising instructions to be executed on the processor that adjust the tuning parameters for a current tuning configuration based on the selected one of the tuning parameters sets.

* * * * *